United States Patent [19]

Horiuchi et al.

[11] 4,443,836
[45] Apr. 17, 1984

[54] AUXILIARY HEAD LAMP DEVICE FOR CAR EQUIPPED WITH COVER

[75] Inventors: Tatsuo Horiuchi; Kazushige Kiyota, both of Tatebayashi, Japan

[73] Assignee: Ushio Denki Kabushiki Kaisha, Tokyo, Japan

[21] Appl. No.: 363,514

[22] Filed: Mar. 30, 1982

[30] Foreign Application Priority Data

Feb. 8, 1982 [JP] Japan ................................. 57-17579

[51] Int. Cl.³ ............................................. F21V 17/00
[52] U.S. Cl. ..................................... 362/375; 362/64; 362/80; 362/82; 362/83; 362/280; 362/295; 362/319; 362/321; 362/359; 362/362; 362/374; 362/376; 280/762
[58] Field of Search ....................... 362/64, 80, 82, 83, 362/280, 362, 295, 319, 321, 359, 374, 375, 376; 280/762

[56] References Cited

U.S. PATENT DOCUMENTS 2,524,442 10/1950 Healey ............................. 362/64
3,544,786 12/1970 Baker ............................... 362/64
3,601,594  8/1971 Carbary ............................ 362/64

Primary Examiner—Stephen J. Lechert, Jr.
Attorney, Agent, or Firm—Ziems, Walter & Shannon

[57] ABSTRACT

The invention discloses an auxiliary head lamp device for a car equipped with a cover which is optionally fitted to a car and is lit during driving in fog or the like. The cover of this device can be opened when a solenoid of a cover driving mechanism is energized by operating a switch disposed inside the room of the car. The solenoid releases engagement of a stopper that restricts the cover urged in the opening direction. The switch may be used also as a switch for a light source bulb. After the solenoid is energized and the opening operation of the cover starts, a current to the solenoid is automatically cut off so that over-heat or burn-out of the solenoid that would occur if the current is continuously applied thereto can be prevented.

8 Claims, 12 Drawing Figures

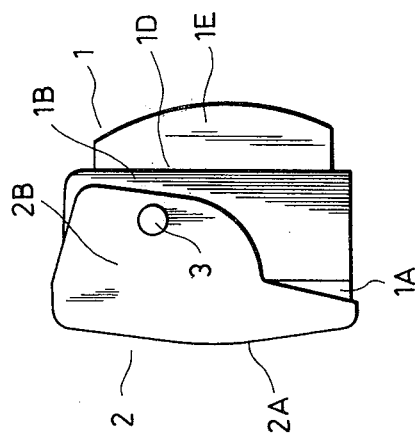
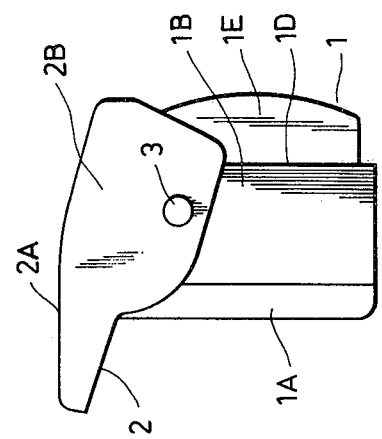
FIG. 1
FIG. 2

AUXILIARY HEAD LAMP DEVICE FOR CAR EQUIPPED WITH COVER

CROSS REFERENCE TO RELATED APPLICATION

The subject matter of this application is related to that disclosed in U.S. patent application Ser. No. 06/363,515, filed on even date herewith by the present inventors and in common assignment herewith.

BACKGROUND OF THE INVENTION

Field of the Invention

This invention relates to an auxiliary head lamp device for a car equipped with a cover and more in particular, to an auxiliary head lamp device for a car equipped with a cover which cover can be opened when a switch is operated.

Description of the Prior Art

An auxiliary head lamp for a car is optionally fitted to a car and is lit in accordance with the driving condition such as in driving in fog or rain or in driving in mountains or the like where ambient illumination is not available. The auxiliary head lamp is directed to improve illumination colors and pattern of the main head lamp fitted to the car and to obtain forward illumination for safer driving. A cover for covering the lens of the lamp is often fitted to the auxiliary head lamp lest the lens is broken by a projected or flying pebble or the like when the lamp is not used or is turned off.

In recent years, the auxiliary head lamp has been widely used with or without the cover not only for illumination for safer driving but also for decoration or stressing the personality of a driver.

In the auxiliary head lamp equipped with the cover, the cover must be removed or must be moved from the position where it covers the lens to the position where it opens the lens, whenever the auxiliary head lamp is necessary, and this operation must be manually done. Since this operation is not possible during driving, the car must be once stopped to open the cover. After all, it is extremely troublesome and inconvenient to remove the cover, especially when it is raining or snowing.

SUMMARY OF THE INVENTION

With the background described above, the present invention is directed to provide a convenient auxiliary head lamp device for a car equipped with a cover in which the cover can be moved from the position where it covers the lens to the position where it opens the lens, by operating a switch.

It is another object of the present invention to provide an auxiliary head lamp device for a car equipped with a cover which is capable of reliably opening the cover by means of the operation of a solenoid actuated by the switch operation and which has less trouble but has extended service life.

It is another object of the present invention to provide an auxiliary head lamp device for a car equipped with a cover which is capable of reliably opening the cover by means of the operation of a solenoid energized by the switch operation and provides extended service life due to the construction in which a current to the solenoid is always cut off after the solenoid is once actuated lest the solenoid is over-heated or burnt-out.

BRIEF DESCRIPTION OF THE DRAWINGS

FIGS. 1 through 3 show the auxiliary head lamp device for a car equipped with a cover in accordance with the first embodiment of the present invention, in which:

FIG. 1 is a side view when the cover is closed;

FIG. 2 is a side view when the cover is opened; and

FIG. 3 is a perspective view when the cover is opened.

FIGS. 4 and 5 show a cover driving mechanism of the first embodiment, in which:

FIG. 4 is a partially cut-away sectional front view; and

FIG. 5 is an enlarged perspective view of the principal portions.

FIGS. 6 and 7 show the cover driving mechanism, in which:

FIG. 6 shows the state when the cover is closed; and

FIG. 7 shows the state when the cover is opened.

FIGS. 9 and 10 show the auxiliary lamp device in accordance with the second embodiment of the present invention, in which:

FIG. 9 shows the cover driving mechanism when the cover is closed; and

FIG. 10 shows the cover driving mechanism when the cover is opened.

FIGS. 11 and 12 show the auxiliary head lamp device in accordance with the third embodiment of the present invention, in which:

FIG. 11 shows the cover driving mechanism when the cover is closed; and

FIG. 12 shows the cover driving mechanism when the cover is opened.

DESCRIPTION OF THE PREFERRED EMBODIMENTS

Figure 3:
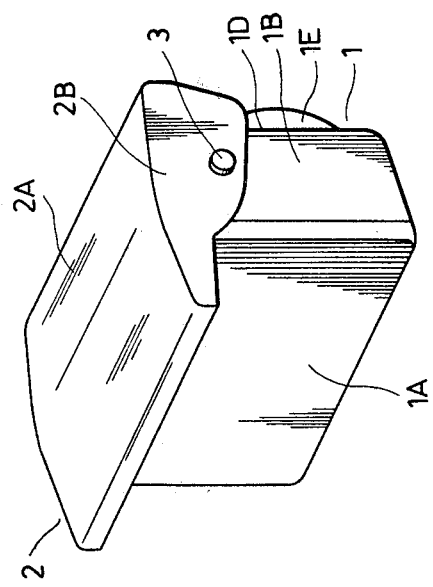
Figure 4:
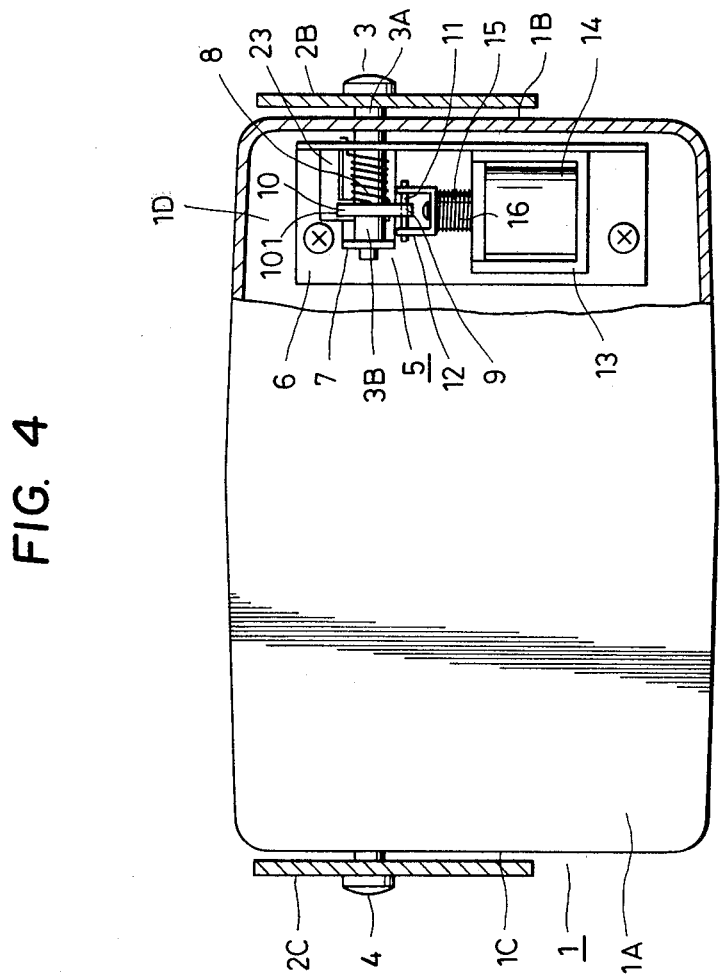
Figure 5:
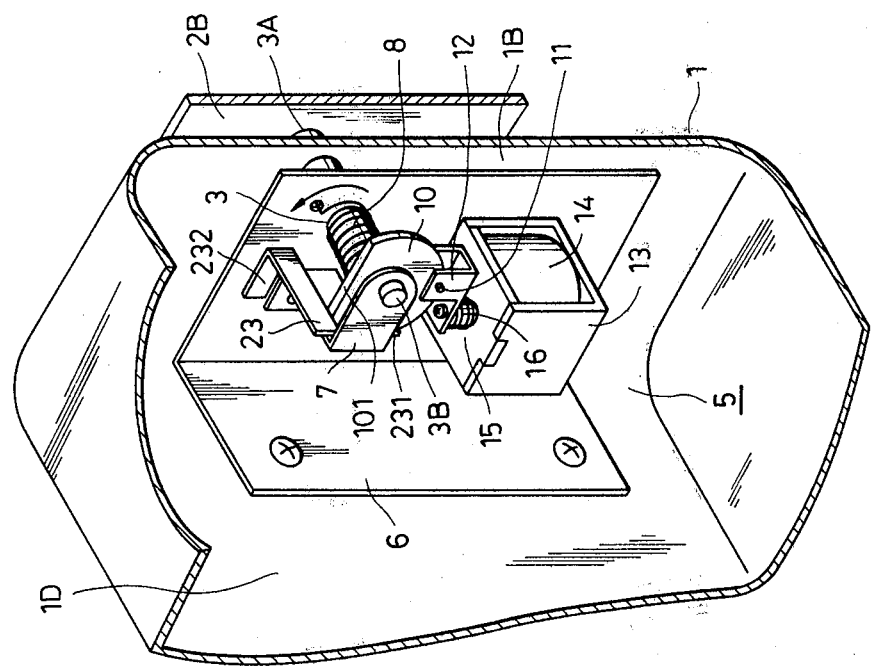

The first embodiment of the present invention is illustrated in FIGS. 1 through 5. In this embodiment, reference numeral 1 represents an auxiliary head lamp for a car (hereinafter referred to as the "auxiliary lamp"). This auxiliary lamp 1 comprises a casing including a lens 1A and a bulb such as a halogen lamp disposed inside the casing. A reflecting mirror is generally disposed inside the casing, or the inner surface of the casing is finished in a mirror surface. A cover 2 consists of a cover portion 2A having a size sufficient to cover the lens 1A and right and left side plates 2B and 2C that project from both side edges of the cover portion 2A and are positioned on the right and left side walls 1B and 1C of the auxiliary lamp 1, respectively. The cover 2 is fixed to the auxiliary lamp 1 by a rotary shaft 3 in cooperation with a connecting shaft 4. The rotary shaft 3 is fitted in such a fashion that its outer end portion 3A is fixed to the right side plate 2B of the cover 1 while its inner portion 3B inwardly protrudes past through the right side wall 1B of the auxiliary lamp 1. The connecting shaft 4 connects turnably the left side plate 2C of the cover 2 to the left side wall 1C of the auxiliary lamp 1 and consists of a screw or the like that is positioned on the extension of the rotary shaft 3. A cover driving mechanism 5 is disposed inside the casing of the auxiliary lamp 1.

The cover driving mechanism 5 has the following construction. A cover driving mechanism support 6 consisting of an L-shaped plate, for example, is fixed to the inner surface of the back wall 1D of the auxiliary lamp 1 close to the right side wall 1B of the auxiliary lamp 1 so that the inner portion 3B of the rotary shaft 3 inside the casing of the auxiliary lamp 1 penetrates through the support 6, rotatably. One end of a rotary shaft support 7 is fixed on this cover driving mechanism support 6 while its other end turnably supports the end of the inner portion 3B of the rotary shaft 3. An elastic member consisting of a spring 8 for urging to rotate the rotary shaft 3 is fitted to the inner portion 3B so that the rotary shaft 3 is urged to rotate from a position at which the cover 2 covers the lens 1A of the auxiliary lamp 1 (hereinafter referred to the "close position") towards a position at which the cover 2 opens the lens 1A (hereinafter referred to as the "open position") in the direction indicated by an arrow in FIG. 5. An operation member is concentrically fixed to the inner portion 3B of the rotary shaft 3. The operation member consists of a disc-like rotary plate or rotary disc 10, for example, having an engaging groove 9 formed at its circumference.

Figure 6:
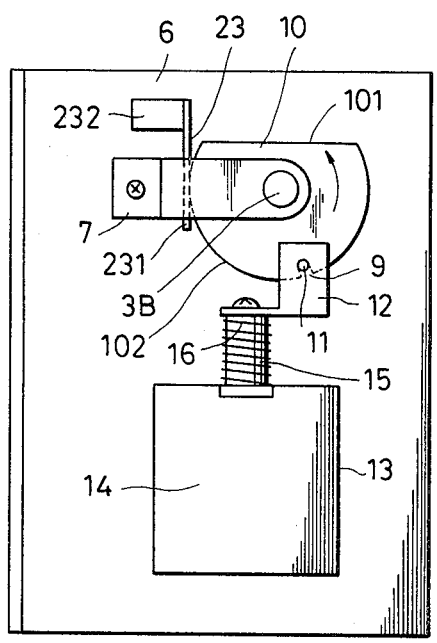
Figure 7:
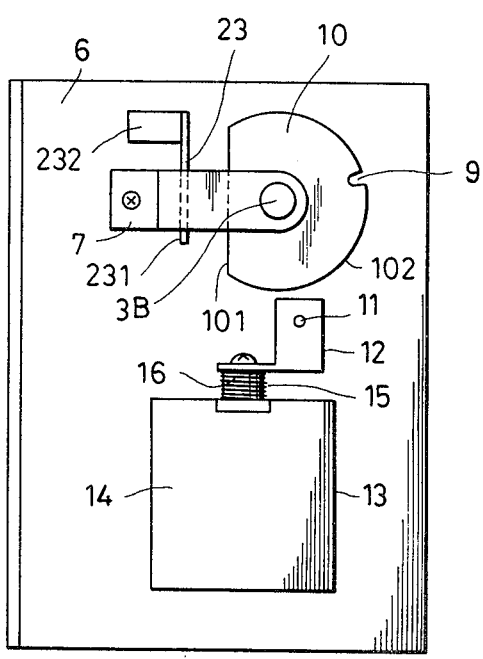

A stopper consisting of an engaging member 11 such as a pin having a shape to mate with the engaging groove 9 of the rotary disc 10 is fixed to an engaging member support 12 disposed at the tip of a plunger 15 of a solenoid 14 which is fixed to the cover driving mechanism support 6 via a solenoid support 13, for example, and forms an operation start driving means. A return spring 16 is fitted to the plunger 15 so that the spring force acts upon the plunger in its projecting direction. The engaging groove 9 of the rotary disc 10 and the engaging member 11 are arranged such that the engaging member 11 is capable of engaging with the engaging groove 9 when the cover 2 is at the close position. The pin of the engaging member 11 and the engaging groove 9 of the disc 10, when mutually engaged, act as a detent to hold the cover 2 in its closed position against the urging of the spring 8. Moreover, the plunger 15 projects as shown in FIG. 6, and disengages from the engaging groove 9 when the plunger 15 is attracted into the solenoid 14 as shown in FIG. 7.

The rotary disc 10 forms an automatic switch mechanism in cooperation with a switch plate 23. The rotary disc 10 is made of an electrically conductive material such as a metal and a part of its outer circumference is cut off to define a notch 101. As can be best seen in FIG. 6, the base portion 232 of the switch plate 23 made of a resilient electrically conductive material such as a metallic plate is fixed to the cover driving mechanism support 6 in such a manner that its tip 231 comes into resilient contact with the outer circumferential edge of an arcuate portion 102 which lies in the forward part of the notch 101 and in the backward part of the engaging groove 9 of the rotary disc 10 in respect of the rotating direction thereof. The shape of the notch 101 and the position of the switch plate 23 are determined such that the notch 101 reaches the position of the tip 231 of the switch plate 23 to bring the rotary disc 10 out of contact from the switch plate 23 before the cover 2 reaches the open position due to the rotation of the rotary shaft 3, and prevents the rotary disc 10 from coming into contact again with the switch plate 23 until the cover 2 reaches the open position and its rotation stops.

Figure 8:
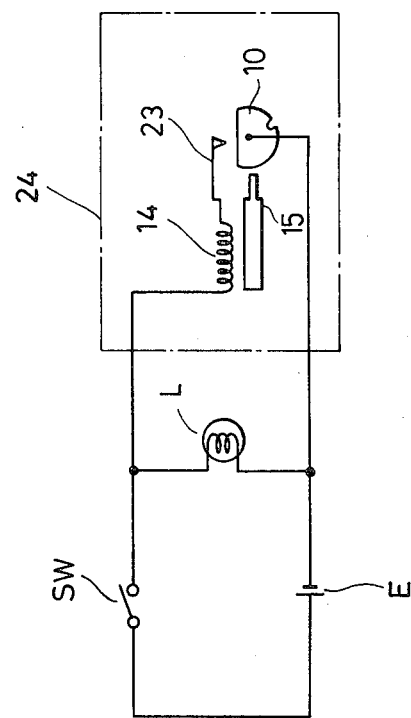
FIG. 8 is a circuit diagram showing an example of a preferred electric circuit used in the first embodiment.

An example of the electric circuit for energizing the solenoid 14 is shown in FIG. 8. A driving circuit 24 comprising a series circuit of the rotary disc 10, the switch plate 23 and the solenoid 14 is connected to a series circuit consisting of a power source E for the auxiliary lamp such as the car battery and a power switch SW disposed in the vicinity of the driver's seat of the car, for example, and the bulb L is connected in parallel to this driving circuit 24.

In practically constructing such an electric circuit, it is necessary that the rotary disc 10 is insulated from the switch plate 23 to prevent short-circuit between them at positions other than their contact points, and for that reason, the cover driving mechanism support 6 and other components may be made of insulating materials.

When the auxiliary lamp is not used or is kept off and the cover 2 is at the close position, the tip 231 of the switch plate 23 comes into contact with the arcuate portion 102 of the rotary disc 10 and is electrically connected thereto. Since the switch SW is turned off and no current is applied to the solenoid 14, however, the plunger 15 of the solenoid 14 is projected by the resiliency of the return spring 16 so that the engaging member 11 engages with the engaging groove 9 of the rotary disc 10, the rotation of the rotary shaft 3 is restricted and the cover 2 is kept at the close position.

In such a state, when the power switch SW is turned on, the bulb L is lit and at the same time, the solenoid 14 is energized so that the plunger 15 is attracted into the solenoid 14 and the engaging member 11 disengages from the engaging groove 9. Consequently, the rotary shaft 3 is rotated by the resiliency of the spring 8 for rotation and the cover 2 fixed to the rotary shaft 3 is moved from the close position to the open position. On the other hand, along with rotation of the rotary disc 10 fixed to the rotary shaft 3, the arcuate portion 102 of the rotary disc 10 slides while keeping contact with the tip 231 of the switch plate 23, and the notch 101 reaches the position of the tip 231 of the switch plate 23 before the cover 2 reaches the open position so that the rotary disc 10 and the switch plate 23 separate from each other, thereby cutting off electric connection and stopping the feed of current to the solenoid 14.

Due to the above-mentioned operation, it is possible in this embodiment to reliably hold the cover 2 at the close position for covering the lens 1A by means of the engaging member 11 in cooperation with the engaging groove 9. At the lighting of the auxiliary lamp, the bulb L can be lit and the cover 2 can be moved from the close position to the open position for opening the lens 1A by the single operation of the power switch SW which also serves as the switch for the bulb L disposed inside the room of the car. This operation can be easily made without stopping the car and is extremely convenient, especially when it is raining or snowing. After the cover 2 is moved from the close position, the feed of current to the solenoid 14 can be automatically stopped by the automatic switch mechanism. Moreover, since this stop of feed of current is effected immediately and reliably after the feed of current to the solenoid 14 is no longer needed, the unnecessary power consumption can be prevented and over-heat and hence, burn-out, of the solenoid 14 due to the continuous feeding of the current can also be prevented.

Since the solenoid 14 is small in size, the cover driving mechanism 5 including the solenoid 14 can be easily disposed inside the casing of the auxiliary lamp 1 and according to this arrangement, almost all moving parts necessary for opening the cover can be protected from external adverse influences. Hence, the device has less trouble and extended service life.

According to the construction of this embodiment in which the cover 2 is urged in the opening direction by the spring 8 for rotation and the engaging member 11 for checking the spring 8 is released when the solenoid 14 is energized, the construction becomes simplified and the cover can be opened rapidly and reliably.

Figure 9:
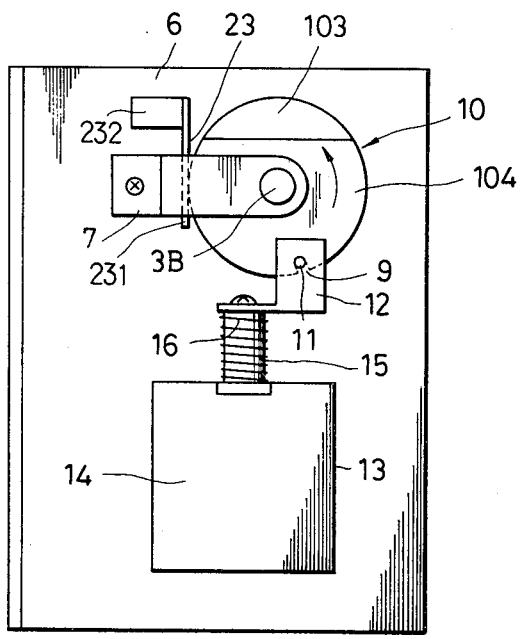
Figure 10:
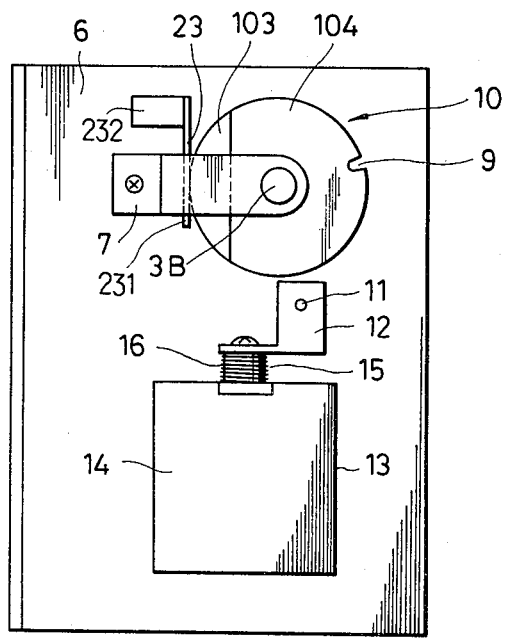

FIGS. 9 and 10 show the second embodiment of the present invention. The rotary disc 10 in this embodiment consists of an insulating portion 103 corresponding to the notch 101 of the first embodiment and an electrically conductive portion 104 and is fixed to the rotary shaft 3 to form the switch mechanism. The position of this rotary disc 10 is selected such that when the cover 2 is at the close position, the switch plate 23 comes into contact with the electrically conductive portion 104 and when the cover 2 is at the open position, the switch plate 23 comes into contact with the insulating portion 103 but not with the electrically conductive portion 104. The same action and effect can be obtained in this switch mechanism as those of the switch mechanism of the first embodiment.

Figure 11:
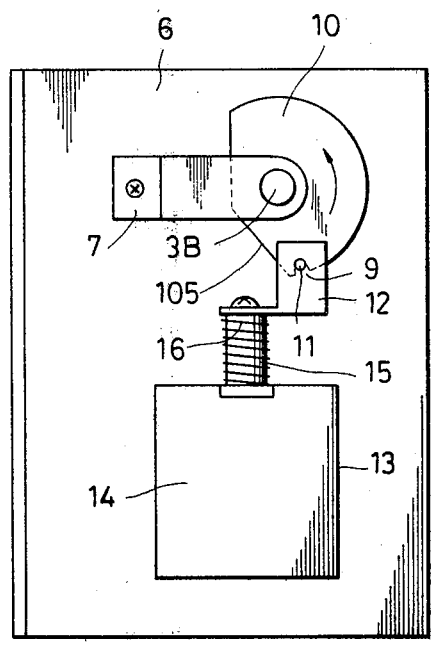
Figure 12:
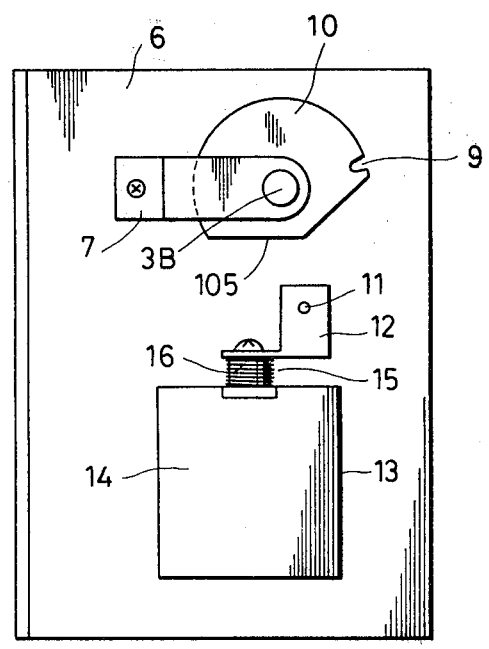

FIGS. 11 and 12 show the third embodiment of the present invention, in which the engaging member 11 is made of an electrically conductive material so as to serve also as the switch plate 23 and the electrically conductive rotary disc 10 has a notch 105 formed at its circumference. The rotary disc 10 is fixed to the rotary shaft 3 so as to form the switch mechanism. The position of the notch 105 of the rotary disc 10 is selected such that when the cover 2 is at the close position, the engaging member 11 is capable of engaging with the engaging groove 9 to contact each other. When a current is applied to the solenoid 14 through the contact of the engaging member 11 and the engaging groove 9, the plunger 15 is then attracted into the solenoid 14 to disengage the engaging member 11 from the engaging groove 9 permitting the rotary shaft 3 to rotate. Just after this, the feed of the current to the solenoid 14 is stopped due to the separation of the contact of the engaging member 11 and the engaging groove 9, and the plunger 15 returns to its original position, but as the rotary disc 10 has been rotated the engaging member 11 is positioned in the notch 105 not to come into contact with the rotary disc 10. Thus, in this construction, too, the same action and effect can be obtained as in the foregoing embodiments.

The driving circuit for energizing the solenoid 14 may have an exclusive switch for the cover independent of the lighting circuit for the bulb of the auxiliary lamp. In this case, the cover can be opened independently of the bulb, and the switch for the bulb can be interlocked with the switch for the cover so that both can be operated by the single switch operation.

If a thermostat switch or switches are interposed in series in the driving circuit 24 in the proximity of the solenoid 14 so that these thermostat switches are opened when the temperature of the solenoid 14 becomes abnormally high, over-heat of the solenoid 14 can be prevented even if the plunger 15 of the solenoid 14 does not accidentally operate and an abnormal current keeps flowing to the solenoid 14.

What is claimed is:

1. An auxiliary lamp device equipped with a cover for a vehicle, comprising: an auxiliary lamp for a vehicle, said lamp including an enclosed casing and a lens attached to said casing, said auxiliary lamp attachable to a body portion of a vehicle; a cover rotatably mounted on said casing for opening and closing the lens of said auxiliary lamp; and a cover driving mechanism for moving said cover from a closed position where said cover covers the lens of said auxiliary lamp to an open position where said cover uncovers the lens of said auxiliary lamp; said cover driving mechanism comprising: a resilient member for urging said cover for movement in the direction from said closed position to said open position; an operation member fixed integrally with said cover and moving integrally with said cover; a detent member engaging with said operation member and restricting movement of said cover against said resilient member when said cover is at said closed position; an electrically operated operation start driving means for disengaging said detent member from said operation member when a current is applied thereto; and an automatic switch mechanism for stopping the current flow to said operation start driving means by movement of said operation member fixed integrally with said cover when said cover moves from said closed position.

2. The auxiliary lamp device equipped with a cover for a vehicle as defined in claim 1 wherein said cover is disposed turnably; said operation member is an electrically conductive rotary disc fixed to a rotary shaft of said cover; said rotary disc has a round shape with a notch formed on a circumferential portion thereof; and said automatic switch mechanism consists of said electrically conductive rotary disc and a switch plate coming into contact with the outer circumference of an arcuate portion of said rotary disc lying in the forward part of the notch of said rotary disc in the rotating direction when said cover is at said closed position.

3. The auxiliary lamp device equipped with a cover for a vehicle as defined in claim 1 wherein said cover is disposed turnably; said operation member is a rotary disc fixed to a rotary shaft of said cover and having a round shape consisting of an electrically conductive portion and an electrically insulating portion; and said automatic switch mechanism consists of said rotary disc and a switch plate coming into contact with the outer circumference of an arcuate portion of said rotary disc lying in the forward part of said insulating portion in the rotating direction when said cover is at said closed position.

4. The auxiliary lamp device equipped with a cover for a vehicle as defined in claim 1 wherein said automatic switch mechanism consists of said operation member which is electrically conductive and the detent member which is electrically conductive.

5. An auxiliary lamp device equipped with a cover, comprising:
an auxiliary lamp for a vehicle, said lamp including an enclosed casing and a lens attached to said casing, said auxiliary lamp attachable to a body portion of a vehicle;
a cover rotatably mounted on said casing for rotation between a closed position in which said lens is covered and an open position in which said lens is uncovered;
an electrically actuated cover driving mechanism connected to said cover for moving said cover from its closed position to its open position, said cover driving mechanism comprising biasing means for resiliently urging said cover towards its open position, and an electrically releasable detent mechanism for holding said cover at its closed position, said detent mechanism comprising an electrically conductive disc member connected to said cover for rotation therewith and having a detent pin receiving groove formed on the periphery thereof and a detent pin connected to a solenoid, said pin engageable with said groove to hold said cover in its closed position and releasable therefrom by application of electrical energy to said solenoid, and electric circuit means for applying electrical energy to said solenoid, said electric circuit means including a current path through said electrically conductive disc and a switch contact means that contacts a peripheral portion of said disc to complete said current path when said cover is in its closed position, said disc disengaging from said switch contact when said cover is moved to its open position.

6. The auxiliary lamp device equipped with a cover as claimed in claim 5 wherein said disc includes a flat side that faces and is spaced from said switch contact means when said cover is in its open position to thereby interrupt said current path.

7. The auxiliary lamp device equipped with a cover as claimed in claim 5 wherein said disc includes an electrically conductive and an insulating portion, said electrically conductive portion contacting said switch contact means when said cover is in said closed position and said insulating portion contacting said switch contact means when said cover is in said open position to interrupt said current path.

8. The auxiliary lamp device equipped with a cover as claimed in claim 5 wherein said detent pin comprises said switch contact means.

* * * * *